United States Patent
Byun et al.

(10) Patent No.: US 9,379,573 B2
(45) Date of Patent: Jun. 28, 2016

(54) POWER TRANSMITTER AND METHOD FOR CONTROLLING POWER TRANSMISSION

(71) Applicant: Samsung Electronics Co., Ltd., Gyeonggi-do (KR)

(72) Inventors: Kang-Ho Byun, Gyeonggi-do (KR); Kyung-Woo Lee, Seoul (KR); Hyuk-Choon Kwon, Seoul (KR); Nam-Yun Kim, Seoul (KR); Hee-Won Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 286 days.

(21) Appl. No.: 13/889,797

(22) Filed: May 8, 2013

(65) Prior Publication Data

US 2013/0342024 A1 Dec. 26, 2013

(30) Foreign Application Priority Data

Jun. 20, 2012 (KR) .................. 10-2012-0066418
Jul. 27, 2012 (KR) .................. 10-2012-0082838

(51) Int. Cl.
*H01F 27/42* (2006.01)
*H02J 7/02* (2016.01)
*H02J 5/00* (2016.01)

(52) U.S. Cl.
CPC *H02J 7/025* (2013.01); *H02J 5/005* (2013.01)

(58) Field of Classification Search
CPC .................................. H02J 5/005; H02J 7/025
USPC ........................................................ 307/104
See application file for complete search history.

(56) References Cited

U.S. PATENT DOCUMENTS 9,065,284 B2 * 6/2015 Malpas ............... A61B 5/0002
2008/0197802 A1 8/2008 Onishi et al.

(Continued)

FOREIGN PATENT DOCUMENTS

CN 102299568 12/2011
JP 11-110501 4/1999

(Continued)

OTHER PUBLICATIONS

European Search Report dated Apr. 7, 2016 issued in counterpart application No. 13806938.0-1804, 8 pages.

(Continued)

*Primary Examiner* — Jared Fureman
*Assistant Examiner* — Duc M Pham
(74) *Attorney, Agent, or Firm* — The Farrell Law Firm, P.C.

(57) ABSTRACT

A method and apparatus are provided for controlling power transmission in a power transmitter. The method includes receiving power information that includes a minimum voltage and a maximum voltage receivable at a power receiver; determining a reference voltage for dividing a range between the minimum voltage and the maximum voltage into a predetermined portions; dividing the range between the minimum voltage and the maximum voltage into a first voltage range between the minimum voltage and the reference voltage and a second voltage range between the reference voltage and the maximum voltage; receiving from the power receiver a report about a power reception condition including a measured voltage at the power receiver during the power transmission from the power transmitter; and adjusting and supplying the power according to which voltage range the measured voltage belongs to among the divided voltage ranges.

30 Claims, 4 Drawing Sheets

(56) References Cited

U.S. PATENT DOCUMENTS

| | | |
|---|---|---|
| 2009/0042525 A1 | 2/2009 | Rajagopal et al. |
| 2010/0039062 A1 | 2/2010 | Gu et al. |
| 2010/0156179 A1 | 6/2010 | Veselic |
| 2010/0259109 A1 | 10/2010 | Sato |
| 2011/0221388 A1 | 9/2011 | Low et al. |
| 2012/0146425 A1 | 6/2012 | Lee et al. |
| 2012/0149307 A1 | 6/2012 | Terada et al. |
| 2013/0099734 A1* | 4/2013 | Lee .................. H02J 7/007 320/108 |
| 2013/0342161 A1* | 12/2013 | Byun .................. H02J 7/025 320/108 |
| 2014/0015330 A1* | 1/2014 | Byun .................. H02J 7/025 307/104 |

FOREIGN PATENT DOCUMENTS

| | | |
|---|---|---|
| WO | WO 2009/126963 | 10/2009 |
| WO | WO 2012/032385 | 3/2012 |
| WO | WO 2012/157971 | 11/2012 |

OTHER PUBLICATIONS

Chinese Office Action dated May 6, 2016 issued in counterpart application No. 201380032357.1, 21 pages.

* cited by examiner

POWER TRANSMITTER AND METHOD FOR CONTROLLING POWER TRANSMISSION

PRIORITY

This application claims priority under 35 U.S.C. §119(a) to a Korean Patent Applications filed in the Korean Intellectual Property Office on Jun. 20, 2012 and Jul. 27, 2012, and assigned Serial Nos. 10-2012-0066418 and 10-2012-0082838, respectively, the entire disclosure of each of which is incorporated herein by reference.

BACKGROUND OF THE INVENTION

1. Field of the Invention

The present invention relates generally to a wireless power transmission system, and more particularly to, a method of controlling power in a power transmission transmitter.

2. Description of the Related Art

Wireless charging or contactless charging technologies have recently been developed and applied to many different electronic devices. The wireless charging technology using wireless power transmission and reception enables, for example, a battery of a cell phone to be automatically charged just by placing the cell phone on a charging pad without a need of a separate charging connector. The wireless charging technology wirelessly charges electronic products and eliminates the need for a wired charger, thus contributing to waterproof ability and portability of the electronic products.

Among the wireless charging technologies, a resonance based charging method is done as follows. When a power receiver that needs to be charged is located in an area of a power transmitter for transmitting wireless power, the power transmitter may charge the power receiver. If a plurality of power receivers are placed in a charging area of a single power transmitter, the power demanded at each power receiver may be different from transmission power. Thus, charging for each power receiver needs to be efficiently conducted.

In this regard, the conventional power transmitter sets up a voltage reference for power control to efficiently supply the power to the power receiver. However, charging efficiency may vary depending on various charging conditions, such as the power receiver's characteristics, hardware design, a distance between the power receiver and the power transmitter, a charging position, etc. If the power transmitter can transmit power that enables the power receiver to achieve its highest power reception rate, it can lead to more efficient charging.

SUMMARY OF THE INVENTION

The present invention has been made to address at least the disadvantages and problems described above, and to provide at least the advantages described below.

An aspect of the present invention provides an apparatus and method of determining and transmitting optimum power demanded by a power receiver.

An aspect of the present invention also provides an apparatus and method of determining a voltage receiving range to maximize a charging efficiency at the power receiver.

In accordance with an aspect of the present invention, a method of controlling power transmission in a power transmitter is provided, the method including receiving power information that includes a minimum voltage and a maximum voltage receivable at a power receiver; determining a reference voltage for dividing a range between the minimum voltage and the maximum voltage into a predetermined portions; dividing the range between the minimum voltage and the maximum voltage into a first voltage range between the minimum voltage and the reference voltage and a second voltage range between the reference voltage and the maximum voltage; receiving from the power receiver a report about a power reception condition including a measured voltage at the power receiver during the power transmission from the power transmitter; and adjusting and supplying the power according to which voltage range the measured voltage belongs to among the divided voltage ranges.

In accordance with another aspect of the present invention, a method of controlling power transmission in a power transmitter is provided, the method including receiving from a power receiver minimum and maximum voltages receivable at the power receiver, and an initial reference voltage used to divide a range between the minimum and maximum voltages into predetermined portions; dividing the range between the minimum voltage and the maximum voltage into a first voltage range between the minimum voltage and the initial reference voltage and a second voltage range between the initial reference voltage and the maximum voltage; receiving from the power receiver a report about a power reception condition including a measured voltage at the power receiver during the power transmission from the power transmitter; and adjusting and supplying the power according to which voltage range the measured voltage belongs to among the divided voltage ranges.

In accordance with another aspect of the present invention, a power transmitter for controlling power transmission is provided, the power transmitter including a wireless communication unit for receiving power information that includes a minimum voltage and a maximum voltage receivable at a power receiver; a controller for determining a reference voltage to divide a range between the minimum voltage and the maximum voltage into predetermined portions and dividing the range between the minimum voltage and the maximum voltage into a first voltage range between the minimum voltage and the reference voltage and a second voltage range between the reference voltage and the maximum voltage; and a resonant signal generator for supplying power to the power receiver under control of the controller, wherein when receiving a report about a power reception condition that includes a measured voltage from the power receiver through the wireless communication unit, the controller adjusts the power according to which voltage range the measured voltage belongs to among the divided voltage ranges and supplies the power through the resonant signal generator.

In accordance with another aspect of the present invention, a method of controlling power transmission of a power transmitter in a power receiver is provided, the method including determining and transmitting to the power transmitter minimum and maximum voltages receivable at the power receiver, and an initial reference voltage used to divide a range between the minimum and maximum voltages into predetermined portions; measuring a power reception condition during power transmission from the power transmitter; and transmitting to the power transmitter a charging report including information about the power reception condition.

BRIEF DESCRIPTION OF THE DRAWINGS

The above and other features and advantages of the present invention will become more apparent by describing in detail embodiments thereof with reference to the attached drawings, in which.

DETAILED DESCRIPTION OF EMBODIMENTS OF THE PRESENT INVENTION

Figure 1:
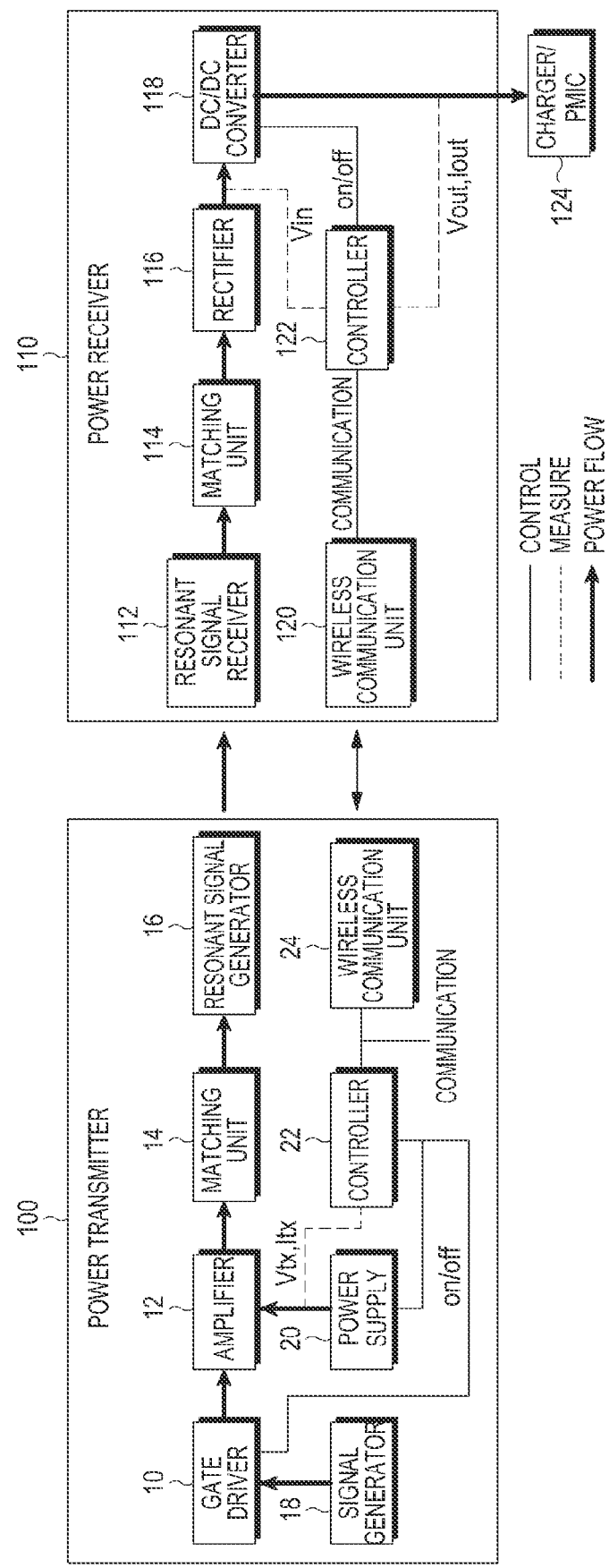
FIG. 1 is a block diagram of a power transmitter and a power receiver, according to an embodiment of the present invention.

Reference will now be made in detail to embodiments, examples of which are illustrated in the accompanying drawings, wherein like reference numerals refer to similar or identical elements throughout. In this regard, the present embodiments may have different forms and should not be construed as being limited to the descriptions set forth herein. Accordingly, the embodiments are merely described below, by referring to the figures, to explain aspects of the present description. Descriptions of some well-known technologies that may possibly obscure the invention will be omitted.

The present invention provides a method of determining a range for a power receiver to achieve its optimum power reception rate. For this, the present invention determines the range to maximize the power reception rate among a range between minimum and maximum voltages receivable at the power receiver. When an optimum reference voltage required by the power receiver between the minimum and maximum voltages is determined, a range between the minimum voltage and the reference voltage is determined to be a best efficient voltage range to maximize the power reception efficiency. The reference voltage is determined by either the power transmitter or the power receiver, and the power transmitter adjusts a voltage to be transmitted to the power receiver so that a reception voltage at the power receiver is within the best efficient voltage range. In this respect, even when the power transmitter transmits power to a plurality of power receivers, the power transmitter maximizes power transmission efficiency by adaptively adjusting power in consideration of the best efficient voltage range for each power receiver.

Prior to explaining the present invention, the reference voltage is defined as follows. For each power receiver, there exists a voltage range having a good charging efficiency, depending on its hardware design, charging condition, etc. In the following description, an input voltage required to determine the voltage range having the good charging efficiency at a power receiver is defined as the reference voltage V_high.

A method of determining the reference voltage for a power receiver will be described with reference to FIG. 1. FIG. 1 is a block diagram of the power transmitter 100 and the power receiver 110 constituting a wireless power transmission system, according to an embodiment of the present invention.

Referring to FIG. 1, the power transmitter is configured to include a signal generator 18 equipped with e.g., a voltage control oscillator (VCO); an amplifier 12 for amplifying with a high gain a frequency signal output from the signal generator through a gate driver 10; a power supply 20 for supplying power such that a signal at a frequency outputted from the signal generator 18 has a resonant frequency determined by a controller 22; a matching unit 14 for conducting impedance matching; a resonant signal generator 16 for transmitting the power from the power supply 20 in a wireless resonant signal according to the high-amplitude signal generated by the amplifier 12; and a controller 22 for generally controlling wireless power transmitting operations.

The controller 22 monitors the current and voltage of the wirelessly transmitted resonant signal according to measurements of the voltage and current of the signal generated by the power supply 20, provides a voltage to the power supply 20 to maintain a predetermined value to be within a normal range, and controls ON/OFF of the gate driver 10. In an embodiment of the present invention, the controller 22 is shown to measure the voltage/current outputted from the power supply 20, but alternatively, a voltage/current measuring unit (not shown) for measuring the voltage/current of the signal generated by the power supply 20 may be added.

In addition, a wireless communication unit 24 is configured to employ one of a variety of wireless short range communication schemes, such as Bluetooth®, to communicate with the power receiver 110 in relation to the operations of the wireless power transmission under control of the controller 22. The resonant signal generator 16 includes a charging substrate on which to locate the power receiver in an upper part of the resonant signal generator 16.

The controller 22 of the power transmitter 100 may be configured with e.g., micro controller unit (MCU), and operations of controlling the power transmission to one or more power receivers will be described below.

The power receiver 110 may include a resonant signal receiver 112 for receiving the wireless resonant signal transmitted from the resonant signal generator 16 of the power transmitter 100, a rectifier 116 for rectifying the power received from a matching unit 114 from an alternating current (AC) form to a direct current (DC) form, a DC/DC converter 118 (also referred to as a constant voltage generator) for converting power outputted from the rectifier 116 into an operating power (e.g., +5V) demanded by a portable terminal established with such a power receiver, a charger/power management IC (PMIC) 124 for being charged with the operating power, and a controller 122 for measuring an input voltage Vin to the DC/DC converter 118 and an output voltage Vout and output current Iout from the DC/DC converter 118. The controller 122 may be configured with an MCU, and serve to determine a power receiving condition based on the measured voltage/current information and provide information about the power reception condition.

A wireless communication unit 120 configured to employ one of a variety of wireless short range communication schemes, such as Bluetooth®, communicates with the power transmitter 100 in relation to the operations of the wireless power reception under control of the controller 122.

Operations of the power transmitter 100 and power receiver 110 with the foregoing configurations are described with reference to FIG. 2. A change in wireless charging conditions in an embodiment of the present invention may be largely classified into a load detection phase, a search phase, a registration phase, a standby phase, and a charging phase.

Figure 2:
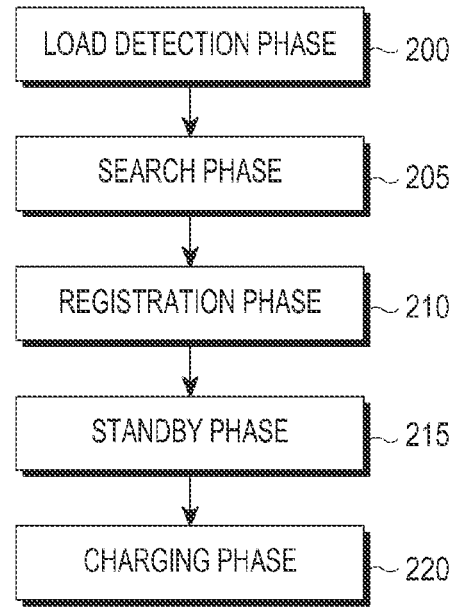
FIG. 2 is a flowchart of operational steps in the power transmitter and the power receiver, according to an embodiment of the present invention.

Referring to FIG. 2, the power transmitter determines if a power receiver is located in a charging area of the power transmitter based on a load change in the load detection phase 200. The search phase 205 searches for an effective power receiver by transmitting power to drive the power receiver. On the other hand, the power receiver is driven by receiving the power from the power transmitter and searches for a nearby power transmitter to register in a wireless power network. For this, a search frame is sent.

In wireless power transmission and reception methods of the present invention, the search frame has a structure as in Table 1.

TABLE 1

| Frame Type | Protocol Version | Sequence Number | Company ID | Product ID | Impedence | Category |
|---|---|---|---|---|---|---|
| Search | 4 bits | 1 byte | 1 byte | 4 bytes | 4 bits | 4 bits |

In the foregoing description, the power receiver informs the power transmitter of values of a category and impedance by using the search frame, and the power transmitter in turn determines whether the power receiver is effective based on the values of the category and impedance from the power receiver. Specifically, when measuring an actual voltage by using the value of impedance received from the power receiver, the power transmitter determines that the power receiver is an effective power receiver if the measured voltage results from reflection of the impedance. If the power transmitter is transmitting power to one or more power receivers, it authenticates the power receivers by considering the fact that each power receiver has a different impedance value. Various conditions at the power transmitter may also hinder the voltage that corresponds to the impedance informed by the power receiver from being measured.

Thus, for a more exact determination of whether a power receiver is effective or not, in addition to factors shown in Table 1, the following factors may also be taken into account.

For determination of effectiveness of a power receiver, factors, such as a size of the resonator, charging power, etc. may be used, and the power receiver may send the factors by including the factors in the search frame as in Table 1. In this regard, the search frame may have new additional fields. Upon receiving the search frame that has new additional fields, the power transmitter determines the effectiveness based on the impedance information and the added factors, e.g., the size of resonator, and an amount of received power. For example, a charging power field includes a value representing one or more power values receivable at the power receiver. If the value included in the charging power value is '0x01', it represents that the charging power of the power receiver is 1 W, if '0x21', it represents that the power receiver may be charged with 11 W or 2 W. The charging power field is useful for the power receiver, i.e., a mobile terminal, to change its charging current/charging voltage.

Once the effectiveness of a power receiver is determined through the foregoing procedure, the power receiver makes a request to subscribe to a wireless power network controlled by the power transmitter. This step corresponds to the registration phase 210 of FIG. 2, in which the power receiver subscribes to the wireless power network controlled by the power transmitter. The power receiver subscribes to the wireless power network by sending a subscription request to the power transmitter and in return receiving a subscription reply. A frame for the subscription request includes a network ID, a power receiver ID, information of minimum and maximum voltages $V\_min$ and $V\_max$ receivable at the power receiver, etc. The minimum voltage $V\_min$ and the maximum voltage $V\_max$ are designed based on a charging capacity according to the category (charging capacity, size of resonator).

In the standby phase 215, the power receiver is on standby until receiving a start charging command from the power transmitter, during which actual charging is not performed. In the charging phase 220, the power receiver begins charging upon reception of the start charging command and performs charging when the controller 122 sends a command to control the DC/DC converter 118 to be ON. Although FIG. 1 shows on/off control to the DC/DC converter 118, 'charging' means power transmission to an external charger 124. For example, a switch (not shown) between the DC/DC converter 118 and the external charger 124 may be used to apply/cut off the power transmission. If charging of the power receiver is completed, or if the transmission power is not enough to charge the entire capacity of the charger 124 of the power receiver, the power transmitter may control the power receiver to be on standby.

Meanwhile, for power transmission in the charging phase 220, it is ideal to keep an amount of transmission power the same as an amount of reception power, but due to many external factors caused in the course of the power transmission, the amount of reception power is inevitably less than the amount of transmission power. Thus, being able to adaptively adjust the voltage or resonant frequency of the power supply 20 so as to generate the transmission power at the power transmitter to be within the best efficient voltage range at the power receiver may help to maximize the power transmission efficiency.

Here, the power transmitter uses the minimum voltage $V\_min$ and the maximum voltage $V\_max$ received from the power receiver in the registration phase 210 to determine power demanded by the power receiver. The minimum voltage $V\_min$ and the maximum voltage $V\_max$ are predetermined in consideration of the power receiver's characteristics at the manufacturing stage, and are sent, periodically or non-periodically, to the power transmitter one or more times in the registration phase 210. Then, the power transmitter determines the amount of transmission power to supply such that the voltage measured at the power receiver falls in the range between the minimum voltage $V\_min$ and the maximum voltage $V\_max$. However, the range between the minimum voltage $V\_min$ and the maximum voltage $V\_max$ is so wide that even if the power transmitter determines and transmits the power demanded by the power receiver, the power reception efficiency at the power receiver may go down.

Thus, an embodiment of the present invention provides a method of determining a portion (range) in which the optimum power reception rate is attainable among the range between the minimum voltage $V\_min$ and the maximum voltage $V\_max$. A power reception range at the power receiver will be described with reference to FIG. 3.

Figure 3:
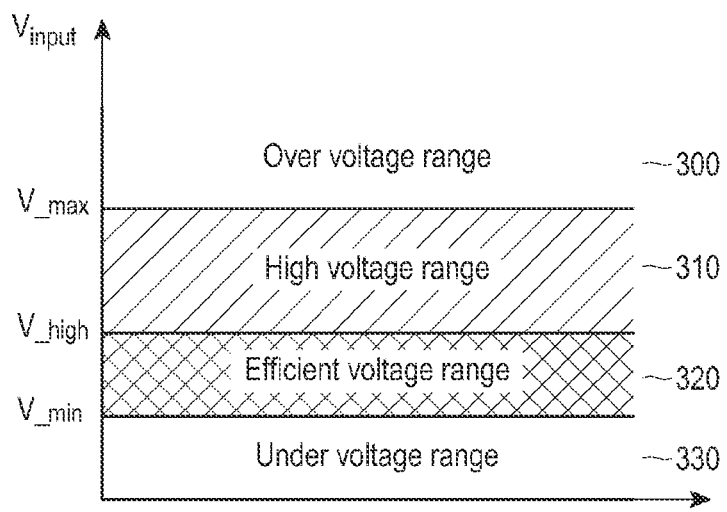
FIG. 3 is a graph which explains setting up ranges of input voltages, according to an embodiment of the present invention.

Referring to FIG. 3, the power reception range at the power receiver is divided into four (portions) ranges: an over maximum voltage range (or over voltage range) 300, an over reference voltage range (or high voltage range) 310 between the maximum voltage $V\_max$ and the reference voltage $V\_high$, the best efficient voltage range (or efficient voltage range) 320 between the minimum voltage range $V\_min$ and the reference voltage $V\_high$, and an under minimum voltage range (or under voltage range) 330. The reason of determining the ranges is to prevent the power receiver from receiving voltages higher than or lower than receivable voltages.

Here, the maximum voltage $V\_max$ to be a reference of the over maximum voltage range 300 represents a voltage that may damage the circuit on the power transmission line at the power receiver. Thus, since the transmission power from the power transmitter that exceeds the maximum voltage $V\_max$ may cause damage to the power receiver, the power transmitter adjusts the transmission power so as not to exceed the maximum voltage V_max. The maximum voltage V_max may be, e.g., 25 V.

The over reference voltage range 310 represents a range within which the reception power may be endured by the power receiver, but is higher than the power demanded by the power receiver.

The best efficient voltage range 320 represents a region having a high power reception efficiency at the power receiver.

The under minimum voltage range 330 represents a region having cut-off voltages at which charging may be terminated, or represents a range having output voltages V_out outputted from the DC/DC converter 118, or having voltages that may cause under voltages at the charger/PMIC 124. The minimum voltage may be e.g., 4.5 V.

Here, to determine the best efficient voltage range 320 in which the power receiver may achieve the optimum power reception rate, the reference voltage V_high needs to be determined. The reference voltage V_high may be determined by the power receiver or by the power transmitter. The reference voltage V_high may be determined in a following manner.

Specifically, when the range between the minimum voltage V_min and the maximum voltage V_max is 100, the reference voltage V_high is determined to be a voltage that becomes a reference for dividing the range into two portions (ranges) of certain percentages. Among them, the best efficient voltage range 320 is where the power reception efficiency at the power receiver 110 is highest. For example, if 30% of the entire range from the minimum voltage V_min is determined as the best efficient voltage range 320, the reference voltage V_high is obtained by following Equation (1).

$$V\_high = V\_min + 0.3*(V\_max - V\_min) \quad (1)$$

In Equation (1), if the minimum voltage V_min is 4.5 V and the maximum voltage V_max is 25 V, the reference voltage V_high becomes 4.5+0.3*(25−4.5), i.e., 10.65 V.

Thus, a range between the reference voltage V_high, 10.65 V and the minimum voltage V_min is determined as the best efficient voltage range 320. A width of the best efficient voltage range 320 is set up to include the range having good power reception efficiencies at the power receiver, and is determined on the following basis.

The best efficient voltage range 320 in which a power reception efficiency higher than a certain efficiency is attainable may be dynamically changed. Depending on the respective component's efficiency, such as the efficiency of the resonant signal generator 16, the efficiency of the resonance signal receiver 112, the efficiency of the amplifier 12, the efficiency of the rectifier 116, the efficiency of the power supply 20, etc., the width of the best efficient voltage range 320 may be set up or re-setup. Furthermore, by utilizing variables to calculate the power loss, the reference voltage V_high for determining the best efficient voltage range 320 may be determined. For example, the efficiency of the DC/DC converter 118 may be obtained by comparing front-end and rear-end voltages of the DC/DC converter 118 of the power receiver 110, and the power transmitter 100 may set up the best efficient voltage range of the power receiver 110 by receiving the efficiency of the DC/DC converter 118 from the power receiver 110. Also, depending on an extent of mismatch (between resonators, between components), device characteristics, incoming impurities, etc., settings of each range may be dynamically changed.

As described above, once the best efficient voltage range is determined, the power transmitter adjusts a voltage to be transmitted to the power receiver such that a reception voltage at the power receiver is within the best efficient voltage range. Also, if the power receiver reports to the power transmitter its power reception condition during charging by including a measured voltage in the report, the power transmitter determines which range the measured voltage at the power receiver belongs to.

If it determines that the measured voltage is within the over reference voltage range 310, the power transmitter drops down the transmission power in order for the measured voltage to be out of the over reference voltage range 310. Furthermore, if an additional power receiver joins while the power transmitter transmits power to a single power receiver, the power transmitter re-adjusts the best efficient voltage range for each power receiver. Thus, even when charging a plurality of power receivers, it is possible for the transmission power for each power receiver to be adjusted to be within the best efficient voltage range. As such, an advantage of the present invention is to enable the power transmitter to determine optimum power and thus control efficient power transmission by taking into account various charging conditions.

A first embodiment of the present invention includes a procedure in which, if the power receiver provides the minimum voltage V_min and the maximum voltage V_max for the power transmitter, the power transmitter determines the reference voltage V_high to be a reference for determining the best efficient voltage range 320 between the minimum voltage V_min and the maximum voltage V_max and determining the best efficient voltage range.

A second embodiment of the present invention includes a procedure in which, if the power receiver determines and provides not only the minimum voltage V_min and the maximum voltage V_max but also the reference voltage V_high in a registration request to the power transmitter, the power transmitter determines the best efficient voltage range by using the reference voltage V_high.

A third embodiment of the present invention includes a procedure in which, if the power receiver determines and provides the minimum voltage V_min and the maximum voltage V_max as well as the reference voltage V_high in the registration request to the power transmitter, the power transmitter determines the best efficient voltage range by using the reference voltage V_high and, whenever receiving a changed reference voltage V_high from the power receiver, changing the best efficient voltage range according to the received reference voltage V_high.

Once the best efficient voltage range is determined through any of the foregoing procedures, the power transmitter initiates charging by providing transmission power in consideration of the best efficient voltage range, and if, in return, the power transmitter receives a power reception condition report including a measured voltage from the power receiver, the power transmitter determines whether the measured voltage is within the best efficient voltage range and accordingly adjusts power.

The procedure of the power transmitter determining the reference voltage V_high if receiving the minimum voltage V_min and the maximum voltage V_max from the power receiver, as in the first embodiment, will be described in detail with reference to FIG. 4.

Figure 4:
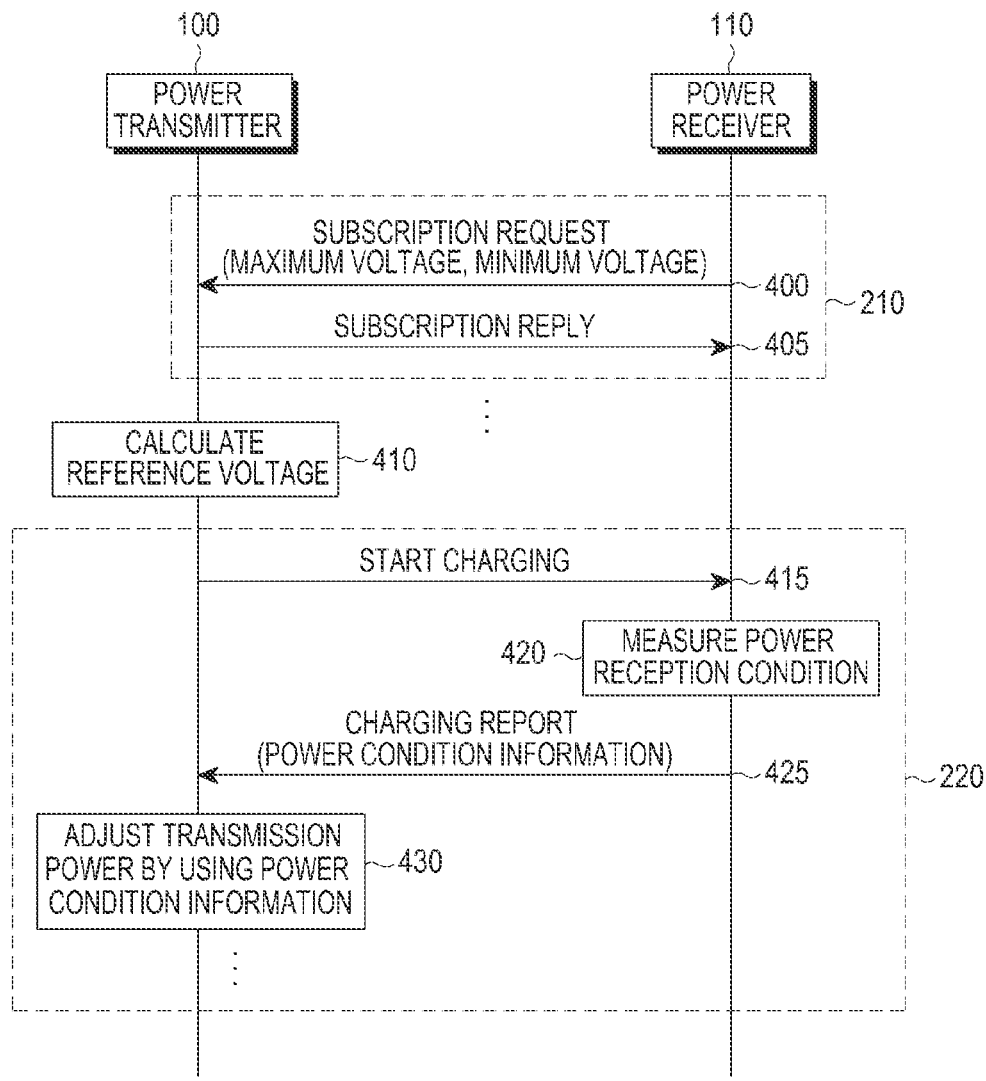
FIG. 4 is a flow diagram representing signal transmission and reception between the power transmitter and the power receiver to determine a reference voltage in the power receiver, according to an embodiment of the present invention.

Referring to FIG. 4, in step 400, the power transmitter 100 receives from the power receiver 110 a subscription request including power information of the minimum voltage V_min and the maximum voltage V_max as well as a reference reception voltage (or typical output voltage), a reference reception current (or typical output current), etc. A structure of a subscription request frame to be used for the subscription request and information included in the subscription request frame are shown below in Table 2.

TABLE 2

| Frame Type | Protocol Version | Sequence Number | Network ID | Product ID | Input Voltage Min | Input Voltage Max | Typical Output voltage | Typical Output Current |
|---|---|---|---|---|---|---|---|---|
| Request Join | 4 bits | 1 byte | 1 byte | 4 bytes | 1 byte | 1 byte | 1 byte | 1 byte |

FIG. 4 illustrates a case in which information including the minimum and maximum voltages are contained in the subscription request frame received by the power transmitter 100; however, the information including the minimum and maximum voltages may be contained in a report frame transmitted by the power receiver 110 to notify the power transmitter 100 of the power reception condition after the power receiver 110 subscribes to the wireless power network controlled by the power transmitter 100. Alternatively, the foregoing information may be contained in a reply message to be transmitted by the power receiver 110 in response to an information request from the power transmitter 100, or may be contained in an acknowledgment frame in response to a subscription reply frame indicating that the subscription of the power receiver 110 to the wireless power network has been completed.

The registration phase 210 is completed when the power transmitter 100 transmits a subscription reply to the subscription request, in step 405. Information of a network ID, a session ID, availability of the power transmitter, etc. is included in the subscription reply. The power transmitter 100 calculates the reference voltage in step 410 by using the maximum voltage and the minimum voltage included in the subscription request. As represented in Equation (1), when the best efficient voltage range is determined by dividing the range between the minimum voltage and the maximum voltage into certain portions, a voltage at which the division is made is determined as the reference voltage. In FIG. 4, calculation of the reference voltage is done after the transmission of the subscription reply; however, it may be done before the transmission of the subscription reply. Upon completion of the registration phase 210, the power transmitter 100 may know of the power demanded by the power receiver 110 and is actually on standby without power transmission.

Sequentially, a charging phase 220 begins with delivery of the start charging command to the power receiver, in step 415. The power transmitter 100 determines initial transmission power based on the power information received from the power receiver 110, and supplies the initial transmission power to the power receiver 110. For example, the initial transmission power may be set to be a value obtained by dividing the multiplication of the reference reception voltage (or typical output voltage) and the reference reception current (or typical output current) by 50%. Then the power receiver 110, in step 420, measures its power reception condition, and in step 425, sends a charging report including power condition information. The power condition information includes the network ID, the session ID, the measured voltage/current at the power receiver 110, the measured voltage/current including an input voltage Vin, an output voltage Vout, and an output current Iout.

The power transmitter 100 adjusts the transmission power based on the power condition information, in step 430. Specifically, the power transmitter determines whether the measured voltage in the power condition information is within the best efficient voltage range, and accordingly, increases or decreases power with respect to the initial transmission power. If the measured voltage is outside the best efficient voltage range but is within the over reference voltage range, the power transmitter 100 reduces the transmission power; and if the measured voltage is within the under minimum voltage range, the power transmitter 100 adjusts the transmission power to increase the transmission power. If the measured voltage at the power receiver 110 lies in the over maximum voltage range, it may cause damage to the power receiver 100 and thus the power transmitter 100 stops the power transmission to the power receiver 110. Even when the measured voltage is within the best efficient voltage range, the power transmitter 100 adjusts the transmission power to have a best efficiency in response to the power information.

Furthermore, in the charging phase 220, the charging report is repeatedly sent to the power transmitter 100 during charging, so that the power transmitter 100 knows the power condition of the power receiver 110 based on the charging report sent during charging, and thus adaptively adjusts the transmission power. In addition, when a new power receiver additionally enters into the charging area, the power transmitter adjusts the best efficient voltage range to avoid a decrease in the transmission efficiency for the initial power receiver due to the participation of the new power receiver.

The procedure in which the power receiver determines and provides each of the minimum voltage V_min, the maximum voltage V_max, and the reference voltage V_high for the power transmitter, as in a second embodiment, will be described in detail with reference to FIG. 5.

Figure 5:
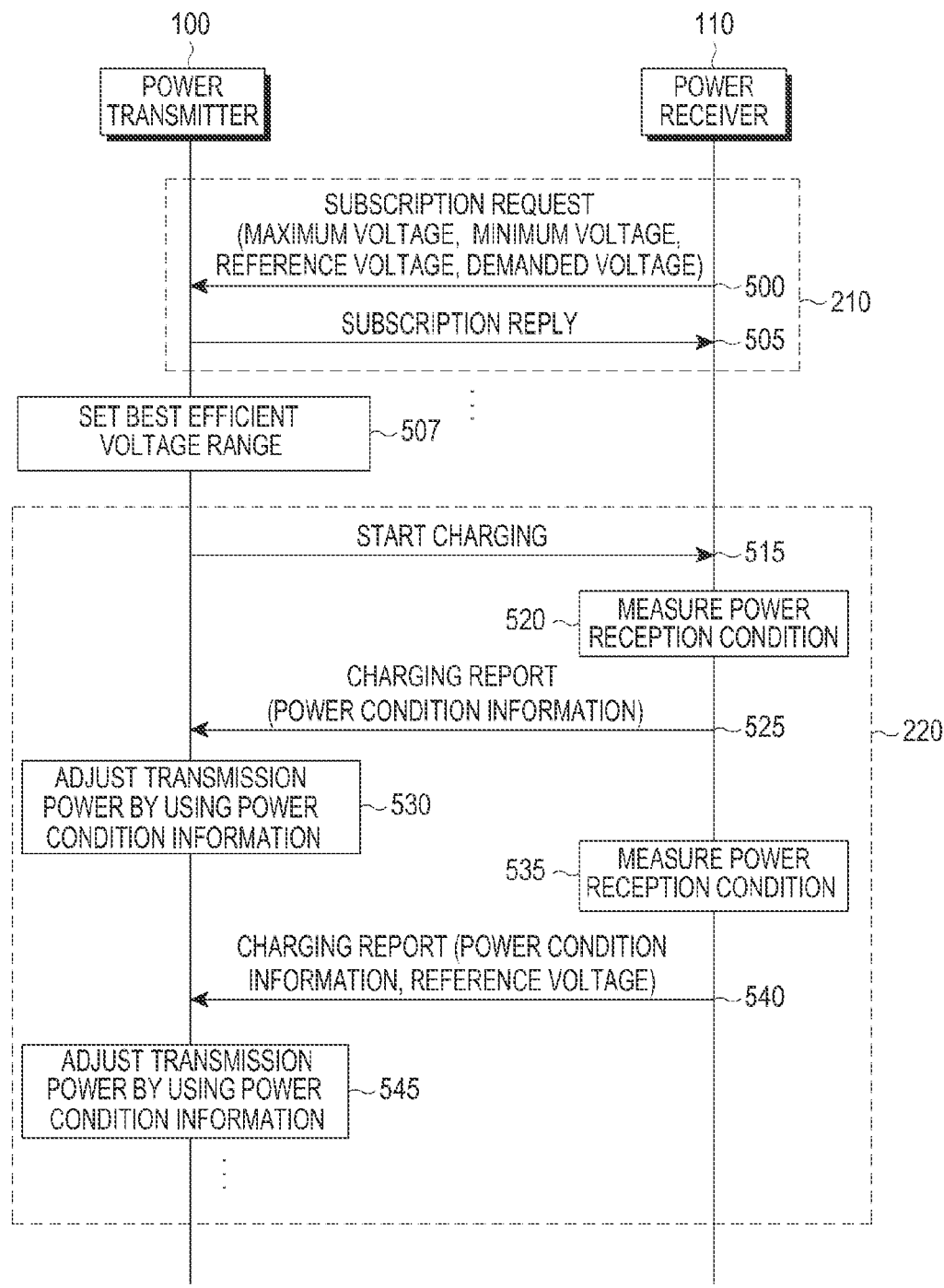
FIG. 5 is a flow diagram representing signal transmission and reception between the power transmitter and the power receiver to determine a reference voltage in the power receiver, according to an embodiment of the present invention.

Referring to FIG. 5, if, in step 500, the power transmitter 100 receives the subscription request from the power receiver 110, the registration phase 210 is completed by the power transmitter 100 transmitting the subscription reply, in step 505. The subscription request includes an initial reference voltage V_high as well as the maximum voltage V_max and the minimum voltage V_min determined by the power receiver 110. The initial reference voltage V_high is a predetermined value in consideration of a reference temperature, charging capacity, and size of the resonator of the power receiver 110. The reference temperature is a predetermined temperature, and may be any room temperature typically used when hardware performance is to be estimated. The reference temperature may serve as a reference for a temperature to be taken into account later when the reference voltage is dynamically changed.

Thus, the power transmitter 100 may determine the best efficient voltage range by using the initial reference voltage V_high, in step 507. In other words, if the power transmitter 100 knows the initial reference voltage V_high, the power transmitter 100 may know not only the best efficient voltage range 320 between the minimum voltage V_min and the reference voltage V_high, but also, as in FIG. 3, the over maximum voltage range 300, the over reference voltage range 310 between the maximum voltage V_max and the reference voltage V_high, and the under minimum voltage range 330. Thus, the power transmitter 100 is able to know a range having a high charging efficiency at the power receiver 110, and determines transmission power such that a voltage belonging to the range may be inputted to the power receiver 110.

After that, the charging phase 220 begins with the power transmitter 100 transmitting the transmission power, in step 515, to the power receiver 110, which was on standby. As the charging begins, the power receiver 110 measures its power reception condition in step 520, and transmits a charging report by including the power condition information in the charging report in step 525. Correspondingly, the power transmitter 100 adjusts the transmission power based on the power condition information, in step 530. This adjustment procedure is the same as the operation of step 430 of FIG. 4.

Specifically, the power transmitter 100 determines if a measured voltage is within the best efficient voltage range. If the measured voltage is outside the best efficient voltage range but is within the over reference voltage range, the power transmitter 100 reduces the transmission power; and if the measured voltage is within the under minimum voltage range, the power transmitter 100 adjusts the transmission power to increase the transmission power. Furthermore, in the charging phase 220, during charging, the power receiver 110 repeatedly measures its power reception condition and reports the power reception condition to the power transmitter, in step 535. The power receiver 110 may newly set the reference voltage V_high by taking into account its power reception condition, according to a third embodiment of the present invention. Accordingly, in step 540, the power receiver 110 sends the charging report by including the newly set reference voltage V_high according to its power reception condition with the power condition information in the report. In this case, the power transmitter 100 adjusts the best efficient voltage range by using the new reference voltage V_high. As the best efficient voltage range is adjusted, the over reference voltage range is changed accordingly. Then, in step 545, the power transmitter 100 adjusts the transmission power to be within the best efficient voltage range by using the power condition information.

In this case, the power transmitter 100 catches the power condition of the power receiver 110 based on the charging report delivered during charging, and adaptively adjusts the transmission power by reflecting the charging condition of the power receiver 110.

According to the present invention, there is an advantage of enabling the power transmitter to determine optimum power and thus control efficient power transmission by taking into account various charging conditions, such as the power receiver's characteristics, charging condition, etc.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A method of controlling power transmission in a power transmitter, the method comprising:
receiving power information that includes a minimum voltage and a maximum voltage receivable at a power receiver;
determining a reference voltage for classifying a range between the minimum voltage and the maximum voltage into a first voltage range and a second voltage range;
receiving from the power receiver a report about a power reception condition including a measured voltage at the power receiver during the power transmission from the power transmitter; and
adjusting and supplying the power according to whether the measured voltage is within the first voltage range or the second voltage range.

2. The method of claim 1, wherein if the measured voltage is within an over maximum voltage range, further comprising stopping the power transmission.

3. The method of claim 1, wherein if the measured voltage is within the second voltage range, further comprising reducing and supplying the power.

4. The method of claim 1, wherein if the measured voltage is within an under minimum voltage range, further comprising increasing and supplying the power.

5. The method of claim 1, wherein if the measured voltage is within the first voltage range, further comprising supplying the power in response to the power information from the power receiver.

6. The method of claim 1, wherein the first voltage range comprises a range having a highest power reception efficiency at the power receiver.

7. The method of claim 1, wherein the power information that includes the minimum voltage and the maximum voltage is included in a subscription request frame sent by the power receiver to subscribe to a wireless power network hosted by the power transmitter.

8. The method of claim 1, wherein the power information that includes the minimum voltage and the maximum voltage is included in a report frame sent by the power receiver to indicate its power reception condition after the power receiver subscribes to a wireless power network hosted by the power transmitter.

9. The method of claim 1, wherein the power information that includes the minimum voltage and the maximum voltage is included in a reply message from the power receiver in response to an information request of the power transmitter.

10. The method of claim 1, wherein the power information that includes the minimum voltage and the maximum voltage is included in an acknowledgment frame for a subscription reply frame indicating that subscription to a wireless power network hosted by the power transmitter has been completed.

11. The method of claim 1, wherein the second voltage range comprises a range having voltages higher than required by the power receiver.

12. The method of claim 1, wherein the power reception condition including the measured voltage comprises at least one of an input voltage, an output voltage, and an output current measured at the power receiver.

13. A method of controlling power transmission in a power transmitter, the method comprising:
receiving from a power receiver minimum and maximum voltages receivable at the power receiver, and a reference voltage used to classify a range between the minimum and maximum voltages into a first voltage range and a second voltage range;
receiving from the power receiver a report about a power reception condition including a measured voltage at the power receiver during the power transmission from the power transmitter; and
adjusting and supplying the power according to whether the measured voltage is within the first voltage range or the second voltage range.

14. The method of claim 13, wherein if the measured voltage is within an over maximum voltage range, further comprising stopping the power transmission.

15. The method of claim 13, wherein if the measured voltage is within the second voltage range, further comprising reducing and supplying the power.

16. The method of claim 13, wherein if the measured voltage is within an under minimum voltage range, further comprising increasing and supplying the power.

17. The method of claim 13, if the measured voltage is within the first voltage range, further comprising supplying the power in response to the power information from the power receiver.

18. The method of claim 13, wherein the power reception condition including the measured voltage comprises at least one of an input voltage, an output voltage, and an output current measured at the power receiver, and a changed voltage according to the power reception condition of the power receiver.

19. The method of claim 18, further comprising adjusting the first voltage range by using the changed voltage.

20. A power transmitter for controlling power transmission, the power transmitter comprising:
   a wireless communication unit for receiving power information that includes a minimum voltage and a maximum voltage receivable at a power receiver;
   a controller for determining a reference voltage to classify a range between the minimum voltage and the maximum voltage into a first voltage range and a second voltage range; and
   a resonant signal generator for supplying power to the power receiver under control of the controller,
   wherein when receiving a report about a power reception condition that includes a measured voltage from the power receiver through the wireless communication unit, the controller adjusts the power according to whether the measured voltage is within the first voltage range and the second voltage range and supplies the power through the resonant signal generator.

21. The power transmitter of claim 20, wherein the controller, if the measured voltage is within an over maximum voltage range, controls to stop power transmission through the resonant signal generator.

22. The power transmitter of claim 20, wherein the controller, if the measured voltage is within the second voltage range, controls to reduce the power and supply the power through the resonant signal generator.

23. The power transmitter of claim 20, wherein the controller, if the measured voltage is within an under minimum voltage range, controls to increase the power and supply the power through the resonant signal generator.

24. The power transmitter of claim 20, wherein the controller, if the measured voltage is within the first voltage range, controls to supply the power through the resonant signal generator in response to the power information from the power receiver.

25. The power transmitter of claim 20, wherein the first voltage range comprises a range having a highest power reception efficiency at the power receiver.

26. The power transmitter of claim 20, wherein the power information that includes the minimum voltage and the maximum voltage is received in any of a subscription request frame sent by the power receiver to subscribe to a wireless power network hosted by the power transmitter, a report frame sent by the power receiver to indicate the power reception condition after the power receiver subscribes to the wireless power network hosted by the power transmitter, a reply message from the power receiver in response to an information request of the power transmitter, and an acknowledgment frame in response to a subscription reply frame indicating that subscription of the power receiver to the wireless power network hosted by the power transmitter has been completed.

27. The power transmitter of claim 20, wherein the second voltage range comprises a range having voltages higher than required by the power receiver.

28. The power transmitter of claim 20, wherein the power reception condition including the measured voltage comprises at least one of an input voltage, an output voltage, and an output current measured at the power receiver.

29. A method of controlling power transmission of a power transmitter in a power receiver, the method comprising:
   transmitting to the power transmitter minimum and maximum voltages receivable at the power receiver, and reference voltage used to classify a range between the minimum and maximum voltages into a first voltage range and a second voltage range;
   generating a report including information about the power reception condition; and
   transmitting the report to the power transmitter.

30. The method of claim 29, further comprising:
   determining a changed voltage according to the power reception condition; and
   including the changed voltage in the report and sending the charging report to the power transmitter.

* * * * *